June 17, 1952 J. L. AMOS ET AL 2,601,200
PRODUCTION OF MOLDING GRANULES
Filed Nov. 9, 1948
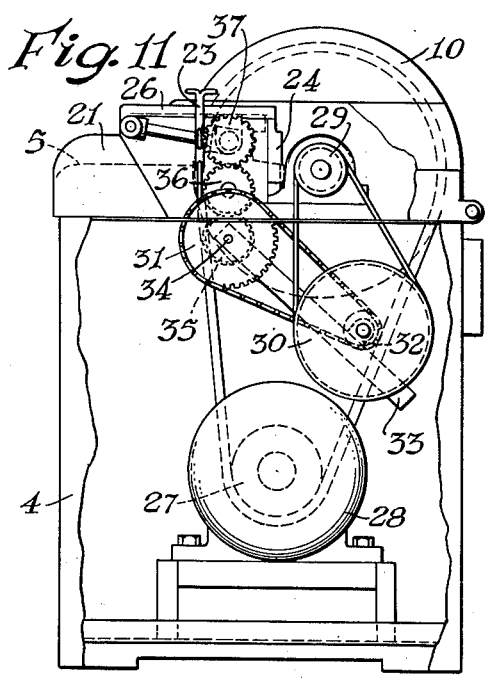

Patented June 17, 1952

2,601,200

UNITED STATES PATENT OFFICE 2,601,200

PRODUCTION OF MOLDING GRANULES

James L. Amos, John L. McCurdy, and Alden W. Hanson, Midland, Mich., assignors to The Dow Chemical Company, Midland, Mich., a corporation of Delaware Application November 9, 1948, Serial No. 59,162

11 Claims. (Cl. 164—17)

This invention concerns an improved method and a machine for producing molding granules from corrugated sheets of thermoplastic organic resins without excessive formation of "fines," i. e. undesirably small resin particles.

It is known to produce molding granules by feeding a slitted sheet of a thermoplastic resin endwise, i. e. in a direction parallel to the slits, to a cutting device where it is chopped into granules by a set of rotating knives, each applied as a downward blow transversely across the sheet. Such a method is described in U. S. Patent No. 2,316,283. Although this known method is applicable to most solid thermoplastic organic resins, those which are fairly brittle, i. e. which have impact strengths of from 0.1 to 1.5 foot-pounds per inch of notch, as determined by the method of A. S. T. M. D256-47T, undergo considerable shattering or crushing when cut in such manner, with a result that the granules vary in size and the product usually contains an excessive amount of fines. In cutting polystyrene by such method, the proportion of fines varies considerably from time to time.

For molding purposes, the thermoplastic resins are generally desired as granules capable of passing through a screen having 3/8 inch openings, but which are retained on a No. 16 U. S. standard screen, and which are nearly free of larger granules or smaller particles. The presence of granules or particles of larger or smaller sizes alters the bulk density of the granular material, renders difficult the measurement of charges to be used in molding operations and may lead to erratic behavior of the material being molded and to occurrence of flaws in the molded articles. The presence of fines in appreciable amount, e. g. in amount exceeding one per cent by weight, is particularly objectionable in the respects just stated.

It is desirable that the granules be produced directly in the sizes desired, since the formation of fines, or unduly coarse granules, represents a loss of material and necessitates extra steps, such as screening or blowing with air in a cyclone separator, to remove the same. Satisfactory removal of fines is frequently difficult due to accummulation of an electrostatic charge on the particles. Also, the fine resin particles are flammable and when dispersed as a dust in air, e. g. in a cyclone separator, involve an explosion hazard.

It is an object of this invention to provide an improved method and a machine for the cutting of corrugated sheets of quite brittle thermoplastic organic resins into molding granules of the above-mentioned desirable sizes without excessive formation of fines or appreciable formation of coarser granules. In general, resins become increasingly brittle with decrease in the impact strengths thereof. The brittle resins with which the invention is concerned have impact strengths of from 0.1 to 1.5 foot-pounds per inch of notch, and the invention may be applied with advantage in pelletizing any thermoplastic organic resin having these impact strength values. Examples of such resins are solid polystyrene, solid polymers of ar-chlorostyrene, ar-dichlorostyrene, alpha - methylstyrene, ar-methylstyrene, ar - dimethylstyrene, ar - ethylstyrene, ar-chloro-ar-methylstyrene, and solid thermoplastic resinous copolymers of any of the above-mentioned monovinyl aromatic compounds with lesser amounts of other olefinic compounds such as acrylonitrile, methylmethacrylate, or divinylbenzene, etc. The invention pertains especially to the production of molding granules from thermoplastic resinous polymers containing, in chemically combined form, 50 per cent by weight or more of a monovinyl aromatic compound having the vinyl radical attached to a carbon atom of the aromatic nucleus and containing not more than two other nuclear substituents, which other substituents are halogen atoms or lower alkyl radicals having not more than 4 carbon atoms. These polymers, rich in a chemically combined monovinyl aromatic compound, are hereinafter termed "vinyl aromatic resins." The invention is concerned more particularly with the production of polystyrene granules.

We have found that corrugated sheets of such brittle thermoplastic resins may be cut to granules of sizes suitable for molding purposes, without appreciable formation of larger granules and without excessive formation of fines, provided that the steps and conditions hereinafter set forth are observed. We have also designed and provided a machine having a rotary cutter which automatically centers the work while cutting the granules in a continuous manner.

The conditions and steps to be observed in producing molding granules by the method of the invention are as follows:

(1) The thermoplastic resin to be cut is quite brittle, i. e. it is one having an impact strength of from 0.1 to 1.5 foot pounds per inch of notch as determined by the method of A. S. T. M. D256-47T.

(2) The sheet of such resin is corrugated, i. e. is provided with a series of parallel grooves and ridges on one or both faces thereof, each rib on one face being opposite a ridge on the other face in the instance in which both faces of the sheet are corrugated.

(3) The maximum thickness of a ribbed portion of the sheet is from $\frac{1}{16}$ to $\frac{1}{4}$ inch, and the minimum thickness of a grooved portion of the sheet is from 0.015 to 0.065 inch. For convenience, resinous material constituting the grooved portions of the sheet is hereinafter termed the "web."

(4) Cutting is accomplished by downward motion of a knife transversely across the corrugations, with the knife edge positioned at an angle of from 20 to 45 degrees with respect to the plane of the sheet as a whole at the point of cutting, while the sheet is resting on a solid support with the end to be cut extending a short distance, e. g. between $\frac{1}{16}$ and $\frac{1}{2}$ inch, beyond the edge of the support.

(5) The sheet must be permitted to flex, but only to a limited extent, during cutting. In order to permit this, the sheet is pressed firmly against the support, along a line approximately parallel to the edge of the support at which the cutting is accomplished, a distance of from $\frac{1}{8}$ to $\frac{1}{2}$ inch from said edge. The bar used to press the sheet against the support may vary in width from a mere line to about $\frac{3}{16}$ inch.

The requirement that the thermoplastic resin have an impact strength of from 0.1 to 1.5 foot-pounds per inch of notch is of importance, since resins having greater impact strengths are not sufficiently brittle to require the precautions of the invention for avoidance of crushing or shattering to fine particles during cutting, and resins having impact strengths of less than 0.1 foot pound are so highly brittle that they cannot be cut to granules by the method of the invention without excessive formation of fines. In other words, the limitation as to the impact strength restricts the invention to thermoplastic resins which are difficult to cut into molding granules without excessive formation of fines, but which can thus be cut by the method of the invention.

Resin sheets having corrugations in only one face thereof are preferred over those having corrugations in both faces, but either may be used. When using a sheet corrugated only on one face, the sheet is preferably positioned with its corrugations upward so as to be first contacted by the descending knife during cutting. However, a resin sheet having corrugations in only one face thereof may satisfactorily be cut to granules in accordance with the invention while positioned with its corrugations downward on a supporting member, e. g. a cutting table, so that the knife first contacts the uncorrugated face of the sheet.

The aforementioned limitations as to the maximum thickness and the web thickness of the resin sheet restrict the invention to sheets that can be cut into individual granules of sizes suitable for molding purposes. The limitations as to the web thickness are of particular importance, since too thin a web may bend without breaking and result in cutting of the sheet into corrugated strips rather than individual granules, whereas a web of too great a thickness may either fail to break during cutting, or may break unevenly, or shatter with formation of fines. There are no critical limitations as to the width of a ridge or groove of the sheet. Usually the web is of from 0.005 to $\frac{3}{32}$ inch width and the rib at its base is usually of from $\frac{1}{16}$ to $\frac{1}{4}$ inch width. In general, the top of a ridge is at least slightly narrower than its base. Otherwise the cross sectional shape of a groove or ridge may be varied widely.

The requirement that the knife edge be at an angle of from 20 to 45 degrees with respect to the plane of the sheet at the point where the sheet is being cut is highly important. When the angle is less than 20 degrees, corrugated strips, instead of individual granules, frequently are cut from the sheet and crushing may occur with formation of fines. Excessively large and irregular sized pieces are cut and broken from the resin sheet when said angle is appreciably greater than 45 degrees. In practice, the knife is preferably applied at an angle of from 30 to 40 degrees with respect to the plane of the sheet.

Upon transversely striking the sheet at a suitable angle, the knife first penetrates slightly a single rib of the sheet. It then presses the rib downward so as to break or split the web between said rib and the adjacent rib, and severs the rib thus separated with formation of an individual resin granule. These operations are repeated with successive ribs across the sheet. In order to obtain such clean breakage of the web joining adjacent ribs of the sheet, without appreciable crushing or shattering of the resin, it is necessary that the sheet be permitted to flex slightly under the action of the knife, but that excessive flexing, bending, or vibration, be avoided. If the sheet is firmly pressed against its support at a point immediately adjacent the point of cutting, the web frequently fails to break between the ribs of the cut portion and corrugated resin strips are formed. Also, the resin is crushed to a considerable extent by the knife and fines are formed in excessive amount. Unrestricted flexing, bending, and vibration of the sheet, during cutting, freqeuntly also results in shattering of the resin with formation of a considerable amount of fines. It has been found experimentally that pressing of the sheet along the line and in the manner set forth in the above item 5 results in the degree of flexing necessary for the production of individual granules without appreciable formation of fines. Such limited flexing of the sheet also permits continuous feed of the material between the overlapping blades of a rotary cutter, such as that illustrated in Figs. 10–12, of the accompanying drawing to produce granules of the desired sizes.

The face of the knife blade remote from the point of feed of the resin sheet is preferably sloped upward away from said point of feed, e. g. said face of the knife may be beveled, but there is nothing critical as to this angle, or slope, and it may be varied widely. The face of the knife nearest the point of feed is preferably also sloped in the same general direction, but it may be substantially perpendicular to the plane of the resin sheet. The blade may be lowered vertically in cutting a resin sheet positioned in a horizontal plane, but it is preferably lowered at a slight incline from the vertical in the direction of movement of the sheet. The knife blade itself may be of any desired shape, e. g. straight-edged, or curved, or of a spiral shape, etc., provided a sharp edge thereof is applied to the sheet in the manner and at the angle of cutting as hereinbefore stated.

In the accompanying drawing, Figs. 1–4 are end views of certain of the various corrugated resin sheets which may be used for the production of molding granules in accordance with the invention. Figs. 7–9 show isometric views of such corrugated sheet, having a cross sectional shape similar to that illustrated in Fig. 2. Figs. 5 and 6 are schematic sketches indicating, by dotted lines, the limiting angles, between a knife edge and the plane of a corrugated resin sheet, at which a downward moving knife may be applied in cutting molding granules from the sheet. It is believed that these sketches will aid in an understanding as to the force vectors that are involved and as to why the angle of cutting is of importance.

Figs. 7, 8 and 9 are sketches illustrating, in a schematic manner, successive stages in the cutting of a granule from a corrugated resin sheet 1, resting on a block 2, by downward movement of a knife 3, held at a suitable angle, e. g. from 30 to 40 degrees, with respect to the plane of the resin sheet. It will be noted that the knife forces downward the segment being cut from a rib of the sheet and thereby splits the web which originally connected said segment to an adjoining rib.

Figs. 10 and 11 are a top view and a side view, respectively, of a machine for producing molding granules from corrugated resin sheets in accordance with the invention. A panel housing 4 that normally covers certain of the mechanical parts is shown as having a section thereof broken away in Fig. 11, in order that the moving parts may be seen.

In Fig. 10, the numeral 4 designates a housing for mechanical elements below the level of a feed table 5 of the machine. The machine is provided with a rotary cutter 6, having the spiral shaped blades 7, at its surface. Bearing blocks 8 and 9 support the cutter 6. Mounted on opposing ends fo the axle of cutter 6 are pulleys 10 and 29, pulley 10 being a drive pulley for operation of the cutter, and the pulley 29 serving for transmission of power from the cutter 6 through a set of pulleys and gears to operate a feed roll, 12, for feed of a resin sheet on table 5 to the cutter 6. The axle of feed roll 12 is mounted in bearings 13 and 14. Bearing 13 is attached to one end of a metal arm 15 having at its other end another bearing 16 which is mounted on a shaft 17. Similarly, bearing 14 is at one end of a metal arm 18 having, on its other end, a bearing 19 which is mounted on the shaft 17. The shaft 17 is mounted on, and supported by side walls 20 and 21 extending upward from the sides of table 5. The arms 15 and 18, which may be swung upward, are provided with spring tensioning members 22 and 23, each anchored to the frame work of the machine, which members 22 and 23 may be tightened or loosened so as to adjust the pressure of roll 12 on a resin sheet being fed to the cutter. A metal bar 24, which presses downward on such resin sheet along a line parallel to the cutting edge of the table, is provided at its ends with arms 25 and 26 extending in the same direction at approximately a right angle to the bar 24. The ends of the arms 25 and 26, remote from bar 24, are also mounted on shaft 17 so that bar 24 may be raised, i. e. swung upward about shaft 17, when desired. The line or band of metal, at the bottom of bar 24, which contacts a resin sheet under treatment is at an average distance of from ⅛ to ½ inch from the cutting edge of the table. The cutter 6 is positioned so that cutting edges of the blades 7 thereof pass downward adjacent to the cutting edge of the table, preferably with a clearance of not more than $\frac{1}{32}$ inch between such knife edge and the table. The axis of rotation of the cutter is usually in, or slightly above, the plane of the upper surface of the table.

Fig. 11 is a side view of the same machine and shows an arrangement of pulleys and gears for operation of the machine. The pulley 10 on the shaft of cutter 6 is connected by a belt with a pulley 27 on an electric motor 28. If desired, other usual means and sources of power for actuating the cutter may be employed. A pulley 29, also mounted on the shaft of cutter 6, is connected by belt with a pulley 30 which, in turn is similarly connected with another pulley 31. The shaft of pulley 30 extends through and is supported by a bearing 32 which, in turn, is mounted near one end of a swinging beam 33. The other end of beam 33 is mounted on, and supported by, a shaft 34. The shaft 34 is supported by a bearing, shown in dotted lines, which bearing is attached to the frame work of the machine. The pulley 31, and also a gear 35, are rigidly mounted on shaft 34 so as to turn with the latter. Gear 35 mates with another gear 36, which, in turn, is mated with a gear 37 rigidly mounted on the shaft of the feed roll 12.

Fig. 12 illustrates, in a schematic manner, the essential working parts of the machine and shows a sheet 38 of resin being fed to the cutter. The mechanical elements of Fig. 12 are numbered to correspond with similar elements shown in the Figs. 10 and 11. In Fig. 12 a portion of table 5 adjacent to the cutter 6 consists of a detachable metal bar 39, commonly termed a cutting bar.

The following examples describe a number of ways in which the invention has been practiced and illustrate certain of its advantages, but are not to be construed as limiting the invention.

*Example 1*

Solid sheets of polystyrene of ⅛ inch maximum thickness and provided with a series of linear V-shaped parallel grooves on one face thereof so that each resultant rib has approximately an equilateral triangular cross section with the web, joining adjacent ribs, of approximately 0.03 inch thickness were cut transversely across the corrugations in the following respective ways. In each experiment, the sheet being cut rested on a cutting table with the end to be cut extending approximately ⅛ inch beyond the cutting edge of the table. A metal bar, parallel to the cutting edge and spaced approximately ¼ inch from said edge, pressed the sheet firmly against the table along the line of the bar, but permitted a limited degree of flexing of the sheet during cutting. In each experiment, cutting was accomplished by downward movement of a knife-blade, or knife-blades, adjacent to the cutting edge of the table and with a clearance between the table edge and the cutting edge of the knife of not more than $\frac{1}{32}$ inch. In one experiment, a rotary cutter having 8 blades, each $\frac{7}{32}$ inch depth, mounted equidistantly and parallel to one another on a shaft of 3 inches diameter, and with each blade-edge at a pitch of 15 degrees with respect to a plane encompassing the principal axis of the cutter, was used for transverse cutting of the corrugated polystyrene sheet. The cutter was mounted with its principal axis parallel to the cutting edge of the table, i. e. each blade edge was at an angle of approximately 15 degrees with respect to the plane of the sheet at the point of cutting. Cutting was accomplished by rotation of the cutter at a rate of 144 R. P. M. while advancing the sheet at the rate necessary for cutting of ⅛ inch lengths therefrom. In this experiment, ⅛ inch corrugated strips, admixed with some individual granules, were cut from the sheet. The experiment was repeated, except that the rotary cutter employed was one having its blades at a pitch of 55 degrees with respect to a plane encompassing the principal axis of the cutter. In this experiment the portions of the sheet subjected to the action of the knife blades comprised a large proportion of broken resin pieces of excessively large and irregular sizes and shapes. The procedure was repeated using rotary cutters having the parallel knife blades thereof at angles of 30 degrees and 45 degrees, respectively, with respect to a plane encompassing the principal axis of the cutter. Using these cutters, the corrugated polystyrene sheets were cut into individual molding granules, principally of from No. 4 to 6 U. S. screen size and substantially free of fines, i. e. containing not more than 0.5 per cent by weight of polystyrene particles capable of passing a U. S. standard No. 16 screen. In another experiment, a corrugated polystyrene sheet was cut by hand into granules of ⅛ inch length using a straight-edged paper knife which was beveled on the side away from the major portion of the sheet. Cutting was accomplished by lowering the knife while maintaining its cutting edge at an angle of 22 degrees with respect to the plane of the polystyrene sheet. In this instance, also, there was obtained a mass of well-formed individual molding granules, principally of from No. 3 to No. 6 screen size and containing less than one per cent by weight of fines.

*Example 2*

Experiments were carried out using a rotary cutter provided with two sets of parallel knives, each set of opposite pitch from the other and each knife extending from the midpoint to an end of the cutter, i. e. the knives were arranged in a herringbone manner. There were 16 knives spaced equidistant from one another about the circumference of the shaft on which they were mounted, or a total of 32 knives. Each knife-edge was at a pitch of 25 degrees with respect to a plane encompassing the principal axis of the cutter. The cutter, from one knife edge to a knife-edge on the other side of the cutter, had an outside diameter of 3½ inches. The depth of each blade was about $\frac{7}{32}$ inch. In one experiment, the cutter was employed, as described in Example 1, for transversely cutting granules of ⅛ inch length from a corrugated polystyrene sheet similar to those employed in Example 1. The granular product had a bulk density of between 0.51 and 0.54 and consisted of well-formed individual granules well adapted for use in molding operations. The granular product contained not more than 0.5 per cent by weight of fines, i. e. resin particles capable of passing through a No. 16 screen. The other experiments were carried out in similar manner, except that the solid polystyrene sheets subjected to cutting varied in web thickness. Each such sheet was corrugated on one face thereof with formation of a series of parallel ribs, each of substantially equilateral triangular cross section, but the thickness of the web joining adjacent ribs varied from one sheet to the next. It was found that the cuttings from sheets having a web thickness of less than 0.015 inch comprised a large proportion of corrugated polystyrene strips and that the material cut from sheets having a web thickness of greater than 0.065 inch comprised a large proportion of irregular shaped granules having sharp jagged edges. The corrugated polystyrene sheets having web thicknesses of from 0.015 to 0.065 inch produced masses of molding individual granules of satisfactory sizes and substantially free of fines.

*Example 3*

Polystyrene sheets, corrugated on one face and of approximately ⅛ inch rib thickness and approximately 0.03 inch web thickness, were cut with a rotary cutter by procedure similar to that described in Example 2, except that the rod, parallel to the cutting edge of the table, which is used for pressing the sheet against the table was omitted in one instance and was moved various distances from said edge of the table in other instances. It was found that when such rod was omitted, excessive vibration and flexing of the sheet occurred with a result that the sheet was cut and broken into pieces of widely varying sizes. The product was not suitable for use as molding granules. Similar results were obtained, though to a lesser extent when the rod pressed downward on the polystyrene sheet along a line at a distance of more than ½ inch from the cutting-edge of the table. When the rod was positioned immediately adjacent to the line of cutting, i. e. so that the line along which the sheet was pressed against its support was less than ⅛ inch from the cutting edge of the table, corrugated resin strips and thin resin shavings were cut from the sheet. Cutting of the sheet to a mass of individual molding granules, nearly free of fines, occurred satisfactorily when the rod was positioned so as to press the sheet against the table along a line at a distance of from ⅛ to ½ inch from the cutting edge of the table.

*Example 4*

Corrugated polystyrene sheets, all of approximately ⅛ inch rib thickness and approximately 0.03 inch web thickness, but having, respectively, the several different cross sections illustrated in Figs. 2–6 of the drawing, were separately cut into molding granules of about ⅛ inch length in accordance with the invention. In each instance, cutting was accomplished by downward movement of a knife having its edge at an angle of from 20 to 45 degrees from the plane of the sheet at the point of cutting, while pressing the sheet against a supporting table along a line parallel to the cutting edge of the table and about ¼ inch from said table edge. The cutting was across the corrugations of the sheet. In each instance there was obtained a mass of polystyrene granules capable of passing a screen having ⅜ inch openings but retained on a No. 12 U. S. standard screen. The products were substantially free of fines, i. e. they contained less than one per cent of polystyrene particles capable of passing through a No. 16 screen.

Other modes of applying the principle of the invention may be employed instead of those explained, change being made as regards the method and machine herein disclosed, provided the steps or means stated by any of the following claims or the equivalent of such stated steps or means be employed.

We therefore particularly point out and distinctly claim as our invention:

1. A method for producing molding granules, which comprises transversely cutting a sheet of a thermoplastic resin, having an impact strength of from 0.1 to 1.5 foot-pounds per inch of notch, which sheet is corrugated by having a series of parallel grooves and ridges on at least one face thereof, and has each ridge on one face opposite a ridge on the other face in the instance in which both faces are corrugated, and which sheet has a maximum thickness at the ridges of from $\frac{1}{16}$ to $\frac{1}{4}$ inch and a web thickness between the ridges of from 0.015 to 0.065 inch, by downward pressing of the sheet against a support with one corrugated end of the sheet projecting from $\frac{1}{16}$ to $\frac{1}{2}$ inch beyond a substantially straight edge of the support, the downward pressing being along a line parallel to and between $\frac{1}{8}$ and $\frac{1}{2}$ inch from said straight edge of the support, and cutting the projecting end of the sheet by downward movement of a knife adjacent to and along the straight edge of the support while positioning the knife edge at an angle of from 20 to 45 degrees with respect to the plane of the supported sheet at each point of cutting.

2. A method, as described in claim 1, wherein the corrugated sheet is repeatedly cut transversely across one end, the sheet being forwarded between cuts to reposition one end thereof in the path of the knife.

3. A method, as described in claim 1, wherein a corrugated face of the sheet is first contacted by the knife during a downward movement of the latter.

4. A method, as described in claim 1, wherein a resin sheet having corrugations only in the upper face thereof is repeatedly cut transversely across one end with forwarding of the sheet between cuts to reposition one end thereof in the path of the knife, and wherein the corrugated face of the sheet is first contacted by the knife during a downward movement of the latter.

5. A method, as described in claim 4, wherein the sheet is automatically centered on its support by simultaneous application thereto of at least one pair of maating knives of opposite pitch with respect to the plane of the supported sheet, which mating knives are applied so as to start their cuts at opposing outer edges of the sheet and complete their cuts at adjacent points approximately midway between the outer edges of the sheet.

6. A method, as described in claim 1, wherein the corrugated sheet is a sheet of polystyrene.

7. A method, as described in claim 4, wherein the corrugated sheet is a sheet of polystyrene.

8. A method, as described in claim 4, wherein the sheet is a sheet of solid polystyrene and wherein the sheet is automatically centered on its support by simultaneous application thereto of at least one pair of mating knives of opposite pitch with respect to the plane of the supported sheet, which mating knives are applied so as to start their cuts at opposing outer edges of the sheet and complete their cuts at adjacent points approximately midway between the outer edges of the sheet.

9. A machine for cutting granules from a corrugated resin sheet, which machine comprises a table for support of the sheet, a rotary cutter positioned so that, during rotation of the same, knife edges thereof descend adjacent to a substantially straight upper metal edge of the table with the segment of each knife edge adjacent to the table edge being at an angle of from 20 to 45 degrees with respect to the plane of the upper surface of the table, means for rotating the cutter at a predetermined rate, means for feeding the resin sheet over the table and to the cutter at a predetermined rate, and means for pressing the resin sheet downward against the table along a line substantially parallel to the cutting edge of the table and at a distance of from $\frac{1}{8}$ to $\frac{1}{2}$ inch from said edge.

10. A machine, as described in claim 9, wherein the cutter is cylindrical and is provided at its cylindrical surface with spiral shaped knives of greater than $\frac{1}{8}$ inch depth and of opposite pitch along opposite halves thereof, the portion of each knife edge adjacent to an edge of the table sloping upward in the general direction of the center of the cutter, and wherein the cutter is positioned with its axis of rotation beyond the end of the table and substantially parallel to the cutting edge of the table and at a level at least as high as the plane of the upper surface of the table.

11. A machine for cutting granules from a corrugated resin sheet, which machine comprises a table for support of the sheet, a cylindrical rotary cutter having spiral shaped knives of at least $\frac{1}{8}$ inch depth and of opposite pitch along opposite halves of the cylindrical surface thereof, the cutter being positioned with its axis of rotation beyond the end of the table and substantially parallel to a straight upper metal edge of the table with edges of knives of the cutter immediately adjacent to said table edge, the knives of the cutter being of a pitch such that the portion of a knife edge adjacent to an edge of the table slopes upward, from the side toward the center of the cutter, at an angle of from 20 to 45 degrees with respect to the plane of the upper surface of the table, means for rotating the cutter so that the blades thereof pass downward adjacent to an end of the table, a rotatable roll above the table and with its axis substantially parallel to the cutting edge thereof, which roll may be lowered to press against a resin sheet on the table, means for rotating the roll, and a loosely held bar substantially parallel to the cutting edge of the table and positioned so as to press downward on a resin sheet on the table along a line substantially parallel to said cutting elge and at a distance of from $\frac{1}{8}$ to $\frac{1}{2}$ inch from the cutting edge of the table.

JAMES L. AMOS.
JOHN L. McCURDY.
ALDEN W. HANSON.

REFERENCES CITED

The following references are of record in the file of this patent:

UNITED STATES PATENTS

| Number | Name | Date |
|---|---|---|
| 651,619 | Tilden | June 12, 1900 |
| 686,705 | Bowerman | Nov. 19, 1901 |
| 1,837,762 | Dale | Dec. 22, 1931 |
| 2,180,903 | Jensen | Nov. 21, 1939 |
| 2,293,178 | Stocker | Aug. 18, 1942 |
| 2,310,851 | Haren et al. | Feb. 9, 1943 |
| 2,399,529 | Willits | Apr. 30, 1946 |
| 2,480,721 | Egenolf et al. | Aug. 30, 1949 |